Jan. 16, 1923.
A. JOHNSON.
SEED SCARIFIER.
FILED MAY 20, 1922.
1,442,275.
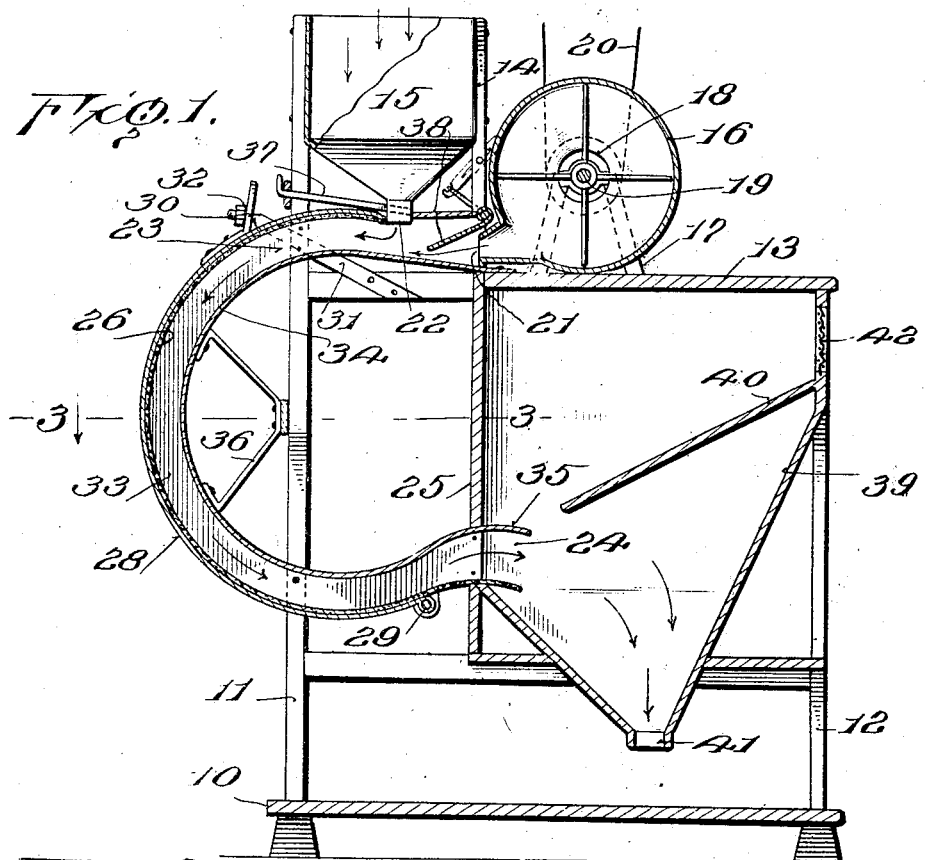
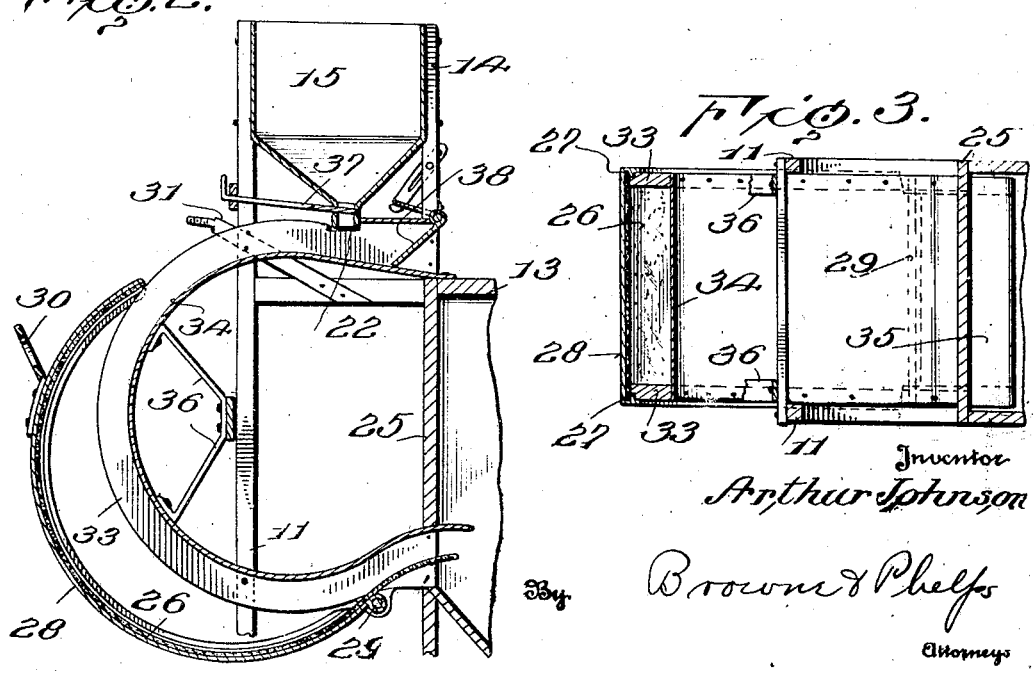
Inventor
Arthur Johnson
By
Brown & Phelps
Attorneys Patented Jan. 16, 1923.

1,442,275

UNITED STATES PATENT OFFICE.

ARTHUR JOHNSON, OF BLACKFOOT, IDAHO.

SEED SCARIFIER.

Application filed May 20, 1922. Serial No. 562,283.

*To all whom it may concern:*

Be it known that I, ARTHUR JOHNSON, a citizen of the United States, residing at Blackfoot, in the county of Bingham and State of Idaho, have invented certain new and useful Improvements in Seed Scarifiers, of which the following is a specification.

The invention relates to seed scarifiers and has as an object the provision of a device of this character which shall be exceedingly simple to manufacture and use.

Many seeds such as alfalfa, sweet clover and other small seeds have a substantially water proof coating of an oily material, which prevents moisture from reaching the interior of the seed for a time and thereby makes the seed slow to germinate. If the seeds can be scratched so as to cut through this coating and allow the moisture ready access to the interior the germination period can be considerably shortened. The device of the invention is designed for this service.

An illustrative embodiment of the invention is shown in the accompanying drawing in which:

Figure 1 is a central vertical section partly in elevation.

Figure 2 is a detail section corresponding to Figure 1 showing the paper holding arc open.

Figure 3 is a detail horizontal section on lines 3—3 of Figure 1.

The invention provides a machine mounted upon a base 10 and comprising a frame having upright members 11, 12 and a top 13. The upright members 11 are shown as extending above the top 13 and in cooperation with other uprights 14 supporting a hopper 15 into which the seed to be treated is placed.

To furnish a blast of air to project the seed against scarifying means, a fan 16 is shown as mounted upon brackets 17 secured to the top 13 of the device. Air is admitted to the fan casing through an annular opening 18 concentric with the shaft 19 and the fan may be driven by a pulley upon the shaft 19 actuated by the belt 20 driven by any suitable source of power.

The nozzle 21 of the fan is shown as discharging closely adjacent the discharge opening 22 of the hopper 15.

The blast from the fan 21 will therefore carry the seed flowing from the discharge 22 into a passageway 23 formed upon an arc of a circle and discharging at 24 into a casing 25 located within the frame of the machine.

The centrifugal force of the seed passing about the arc of the channel 23 will cause it to hug the outer surface also the tendency of the blast from the fan to travel in a straight line will assist the centrifugal force to cause the seed to pass in contact with such outer surface. To scarify the seed as it rubs upon the surface of the channel the said surface is covered with sand paper 26 which may be the material commonly designated garnet paper and which is obtainable in rolls of considerable length.

If desired the garnet paper may be cut or purchased of the proper width and may be slipped into the grooves 27 in the edge of the outer cover 28 of the channel 23, which for convenience in attaching the paper is shown as hinged at 29 so as to make it possible to swing it to the position shown in Figure 2. After the paper has been slipped into the grooves 27 the cover 28 may be closed and secured in a desirable manner. As shown a bracket 30 is secured to the cover 28 and has perforations adapted to seat upon the end of straps 31 and a nut 32 may be screwed upon a rounded and threaded end of the strap 31, a strap 31 being provided upon each side of the cover 28. Tightening of the nuts 22 will cause the paper 26 to be clamped between the cover 28 and the edges of the arc shaped members 33 forming the sides of the channel 23.

The inner member 34 of the channel 23 may desirably be formed of sheet metal having one end secured to the top 13 of the device and the opposite end extended within the box 25 as at 35. Brackets 36 may be secured to the upright members 11 and to the members 33 for support of the arc shaped channel. A feed board 37 is shown to adjust the feed of the seed from the hopper 15 and an air valve 38 to adjust the volume of air supplied by the fan 16.

The seed will be delivered from the channel 23 with considerable force and a large volume of air will also be admitted to the box 25 from the outlet of the channel. To prevent the seed from flying upward or rebounding from the inclined bottom 39 of the box 25, a splash board 40 is shown as dividing the box into two chambers. Much of the air fed by the fan to the device will escape through the discharge 41 of the machine. The surplus will pass between the edge of the board 40 and the end 35 of the interior channel closely adjacent, and will escape through the screened opening 42 from the box 35.

The device provided by the invention is believed to consist of only the essentials for the performance of the function desired and the relative arrangement of parts is such as to make the simple device successful.

Minor changes may be made in the physical embodiment of the invention without departing from its spirit.

I claim:—

A seed scarifier comprising in combination, a casing having a channel providing a curved path, a cover for the outer surface of said channel hinged adjacent one end, a sheet of abradant material lining the inside of said cover, means to hold said cover closed and to clamp said abradant material, a fan to deliver a blast of air to said channel, a seed hopper closely adjacent said fan to deliver the seed in a sheet like stream into said blast, a chest at the discharge of said channel, means in said chest to separate the air and seed.

ARTHUR JOHNSON.